US007014691B2

(12) United States Patent
Lewin (10) Patent No.: US 7,014,691 B2
(45) Date of Patent: Mar. 21, 2006

(54) APPARATUS AND METHOD FOR TREATING COMPRESSED AIR

(76) Inventor: Henry B. Lewin, 1801 N. Tuckahoe St., Arlington, VA (US) 22205

( * ) Notice: Subject to any disclaimer, the term of this patent is extended or adjusted under 35 U.S.C. 154(b) by 33 days.

(21) Appl. No.: 10/399,683

(22) PCT Filed: Oct. 19, 2001

(86) PCT No.: PCT/US01/32500

§ 371 (c)(1),
(2), (4) Date: Aug. 21, 2003

(87) PCT Pub. No.: WO02/34366

PCT Pub. Date: May 2, 2002

(65) Prior Publication Data

US 2004/0040273 A1    Mar. 4, 2004

Related U.S. Application Data

(60) Provisional application No. 60/242,138, filed on Oct. 23, 2000.

(51) Int. Cl.
*B01D 45/00* (2006.01)
*B01D 46/00* (2006.01)
*B01D 50/00* (2006.01)

(52) U.S. Cl. .............................. 96/130; 96/134; 96/143; 96/421; 96/426; 55/310; 55/315; 55/418; 55/459.1; 55/DIG. 17; 55/DIG. 34; 116/206; 73/23.2; 73/31.03

(58) Field of Classification Search .................. 55/315, 55/417, 418, 459.1, DIG. 17, 310, 410, DIG. 34; 96/121, 130, 134, 143, 144, 421, 424, 425, 96/426; 95/267, 268, 273, 274, 279; 116/206; 73/23.2, 31.03, 40.5 R
See application file for complete search history.

(56) References Cited

U.S. PATENT DOCUMENTS 2,440,326 A    4/1948   Cadman
3,661,009 A  * 5/1972   Leonard et al. ............ 73/31.03

(Continued)

FOREIGN PATENT DOCUMENTS

| EP | 0752265 | 1/1997 |
|----|---------|--------|
| EP | 0919271 | 6/1999 |
| GB | 1 357 613 | 6/1974 |
| GB | 2 222 535 A | 3/1990 |
| JP | 3186315 | 8/1991 |
| WO | WO 98/45025 | 10/1998 |

OTHER PUBLICATIONS

Supplementary European Search Report dated Nov. 30, 2004.

*Primary Examiner*—Robert A. Hopkins
(74) *Attorney, Agent, or Firm*—Crowell & Moring LLP (57) ABSTRACT

An apparatus for treating compressed air from a rail yard compressed air supply pipeline leading from a central air compressor to outlets at remote locations in a rail yard prior to charging air brake lines of trains with compressed air from the pipeline to prevent contaminants such as moisture, entrained atomized oil and/or particulates such as rust from getting into the air brake line of the train. The apparatus includes an air line, an air inlet connector at one end of the air line, an outlet connector at the other end of the air line, and at least one separator device interposed in the air line between the inlet connector and the outlet connector for separating contaminants from a stream of compressed air passing through the apparatus. A test apparatus for testing compressed air for oil contamination and a method of preventing contamination of an air brake line of a train with contaminants from a rail yard compressed air supply pipeline used to charge the air brake lines of trains at remote locations in a rail yard with air from a central compressor system is also disclosed.

21 Claims, 7 Drawing Sheets

U.S. PATENT DOCUMENTS

| | | |
|---|---|---|
| 4,113,451 A | 9/1978 | Frantz |
| 4,213,044 A | 7/1980 | Perrotta |
| 4,231,768 A | 11/1980 | Seibert et al. |
| 4,459,266 A | 7/1984 | Lamoreaux |
| 4,812,148 A | 3/1989 | Hata et al. |
| 5,046,786 A | 9/1991 | Johnston et al. |
| 5,186,522 A | 2/1993 | Spencer |
| 5,330,723 A | 7/1994 | Martin et al. |
| 6,004,383 A | 12/1999 | Kuehnelt |
| 6,126,724 A | 10/2000 | Martin et al. |

* cited by examiner

APPARATUS AND METHOD FOR TREATING COMPRESSED AIR

BACKGROUND OF THE INVENTION

The present invention relates to an improved apparatus for cleaning, drying and testing for oil content in air generated from compressors or other sources of flow and delivered through a delivery system where there is a need or desire to remove oil, particulate matter or water droplets and or humidity from a gas stream.

In the railroad industry, the owners and operators of locomotive and other railroad equipment require or find it operationally desirable to remove as much water vapor, oil, humidity and particulate matter from compressed air as possible, when such air is used to charge and operate the air brake system of the equipment. Additionally, it is desirable to be able to measure the oil content that contaminated the gas stream in order to determine proper maintenance of the compressors and extend the life of air brake equipment of locomotives and cars.

Many railroads utilize dryers and after coolers on their locomotives and yard compressors. For the most part, these dryers and after coolers are very efficient in removing the humidity generated from the process of compressing air; however, they do little to protect the system from oil contamination. Moreover, the presence of oil, will destroy the desiccant's ability to adsorb water vapor. A properly maintained locomotive dryer system with an effective and clean desiccant, is particularly efficient because the system generates air that has been cleaned and dehumidified and deposited directly into the equipment train line through air hose couplings directly between the locomotive air system and each adjoining car.

The yard compressors present a different and unique problem. The yard compressors generate compressed air that, in most instances, is dehumidified with a similar air dryer. The dry air is then delivered to a series of outlets that are located at the head or rear location of various tracks by means of an underground piping system. This piping can be thousands of feet long before reaching the outlet ports for delivery to the train line. This piping is, in many instances, made of steel threaded together with couplings. Subsequently, any breach or loosening of the pipe or couplings will allow groundwater and particulate matter to enter the pipe, thus contaminating the airflow. Even though the air may be dry as it leaves the central compressor, as a practical matter is it virtually impossible to prevent moisture from entering the compressed air through leaks in the piping system between the point of generation and the point of use. Whether this moisture is present in the form of humidity or condenses to liquid water, it is detrimental to the ultimate use. Rust can also be created when these factors are present causing additional problems. Additionally, because the piping is usually below ground surface level, the temperature is significantly below the ambient temperature of the compressed air when it leaves the compressor. A dryer which uses a desiccant for example may reduce the moisture content level to withstand a dew point depression of 20 degrees below ambient. This means that if the air is cooled 20 degrees below its ambient temperature after leaving of the dryer, it will begin to condense and form water droplets. This underground piping system used to deliver air to cars and locomotives is almost universally used in the railroad industry and proves effective means of delivering air to pre-charge trains and cars. It eliminates the time that might otherwise be needed to charge a train line using a locomotive compressor only. However, because of leakage, rust, groundwater and excessive cooling of the air that occurs as a result of the air delivery piping running for hundreds and sometimes thousands of feet under the ground from the compressor, the dryers used on yard compressors at the source are not effective and cannot prevent water seepage into the delivery line. Moreover, if excessive cooling occurs, the dryer is not effective in keeping moisture from entering the train's brake system unless moisture is removed to the point significantly below the ambient moisture level at the source. This is not always possible. Short of removing the compressor to a closer location or replacing old leaking underground piping, there is no practical effective device which is in use to address this problem.

The seriousness of contaminants entering the air brake system cannot be overstated. The presence of oil, rust, particulate matter and excessive moisture cost the U.S. railroad industry up to in excess of $50 to $60 million a year in clean oil test and stencil (CO T. & S.) cost alone. U.S. federal regulations mandate the railroad industry to change out Passenger Locomotive air valves on a 36 month preventative maintenance plan. On the freight side, there are approximately 30,000 locomotives in the United States at an estimated cost of $5000 to $6000 per locomotive this equates to $150 to $180 million. This cost does include all of the other remedial costs associated with this maintenance regulation.

The contaminant problem and the lack of a cost-effective means to address it is a significant factor in the 36 month time interval mandated for CO T.& S. If the industry were able to address this issue by monitoring and reducing the contaminants levels entering into the brake system, the cost would be significantly reduced by providing a longer life expectancy for the air brake valves and justification for increasing the CO T.& S. time interval.

The present invention also relates to an improved apparatus and method for the testing of oil content in a gas stream generated by compressors and has application to the railroad, commuter and trucking industries. For example, in the railroad industry the owners and operators of railroad equipment use compressors to generate air pressure to operate their brake systems. This type of air brake system is also used in the commuter and trucking industries. Many of these compressors utilize air dryers which use a desiccant type filter to remove humidity from the air. If the humidity is not removed from the air, the vapor can condense into water. Additionally, the brake valves which are used to operate the brake system have rubber components that are adversely affected and react to the presence of oil, water and/or other contaminants. The industry has long sought an efficient and cost effective means to monitor the oil content in the compressed air. The presence of oil in the air will reduce the life expectancy of valves and other components, as well as the desiccants which are used to dry the air. Additionally, the presence of oil in the air is an indication that the compressor rings are worn or broken allowing oil lubricants to leak into the air supply.

In the railroad industry, as well as in the trucking industry, current methods to detect oil are costly and time-consuming. These methods can require costly modifications to the equipment to attach monitoring devices or idle equipment for extended periods of time while the tests are performed.

Federal regulations relating to air pressure of train lines in the railroad industry are governed by regulations under part 49 CFR 232 and 49 CFR 238 (freight and passenger). FTA safety regulations are covered under 49 CFR 659.31 and reference the manual for development of rail transit safety program plans (A. P. T. A.) Aug. 20, 1999. The Federal regulations relating to the trains air brake pressure requires that the train line may not exceed a 5 pound leak during the test for initial terminal brake. Alternatively, Federal regulations also allows an alternative method of testing that is referred to in the industry as the "air flow method". Use of this method allows up to 60 cubic feet per minute of leakage.

SUMMARY OF THE INVENTION

The present invention addresses these issues and overcomes contaminant problems by providing a cost-effective, easily used, and versatile filtration unit at the end of the delivery line prior to the air being delivered into the train line of cars and locomotives. Its portability allows for its easy and immediate use on various air lines without expensive modification. If the user chooses, it can be temporarily attached by the use of a glad hand or other suitable connector. Attentively, it could be permanently attached to the air line of a piece of equipment such as a locomotive.

The apparatus of the invention comprises a suitable connector at each end for connection to a compressed air source, such as a supply line from a rail yard compressor, and to a train line. A preferred embodiment uses standard railroad gladhand connectors for this purpose. The apparatus of the invention also comprises a replaceable air filter, a cyclonic dirt collector, and/or an air desiccant filter canister. In a preferred embodiment the air desiccant chamber uses an electric relay or air driven clock blow down mechanism for opening and closing directional relay valves. This is used to direct a timed burst of dry air into the train line and then close the airflow to the train line and blow down cycle of the wet desiccant to atmosphere. The train air pressure is protected by a check valve. The vent to atmosphere may, if desired, incorporate a protective air diffusor to prevent possible injury to personnel from vented compressed air. The invention also incorporates the use of the oil indicator connected in line with the air stream to measure oil contaminants levels within the airflow.

The apparatus of the invention is assembled in such a fashion that it may be used according to the specific needs of any given situation. For example, if dew point humidity variables are at a marginal level, the device could be used or made with a desiccant filter designed to run using an air clock mechanism or electrically operated relay. If dew point humidity is not a problem, however water droplets, oil or particulate matter are present in moderate levels, a combination dirt collector/filter may be used in combination with each other. If contamination is only marginal, then a filter or a dirt collector alone may be sufficient to meet a standard. The apparatus of the invention can be constructed to accommodate all three types of filtration or any combination thereof. The invention may be designed to accommodate a single filter feature or combinations thereof. The device may also be designed to accommodate an oil indicator that measures the oil content present in the gas stream.

A blow out conduit and valve may be installed in line upstream of the filter to allow condensation to be blown from the line prior to filtration or testing. The blow down conduit tube can be configured in such a fashion that it can also be used to insert a test probe to test dew point humidity. It may be designed to accommodate a test probe conduit at both ends of the filtration system.

In one preferred aspect the invention comprises a filtration apparatus for use at the end of the piping delivery system of a compressor, to filter a gas streams from particulate matter, oil, water and water vapor, utilizing a gladhand or other suitable connector.

In accordance with another preferred aspect, the invention comprises one or more desiccant filters to remove humidity from a gas streams that is collected beyond the point of generation of compressed air at the end of the piping delivery system. In a particularly preferred embodiment, the apparatus is operated electrically or by use of an air driven clock type mechanism to open and close relay valves mechanically, pneumatically or electrically to cycle the desiccant from dry air to blowdown.

In another aspect the invention comprises a device that utilizes a gladhand for a connector to yard air plant lines or railroad equipment air hoses.

A further aspect of the invention involves a suitable branch tee conduit arranged downstream of the filtration units that will accommodate a probe for measuring the oil content of the air stream utilizing an oil indicator or a meter designed to measure moisture content or particulate matter.

In another aspect the invention includes a pressure gauge and regulator shut off valves to regulate air flow to determine humidity, particulate matter, or oil content upstream or downstream of the filtration system.

Another aspect of the invention involves providing a valve situated at the inlet for blowing condensation from the line before the condensation can enter the filtration system.

A still further aspect of the invention is an apparatus containing check valve to protect the train brake pipe pressure immediately after and prior to the air entering the train line.

According to yet another aspect of the invention the apparatus contains a blow down conduit tube and/or a tube which can be used to insert a test probe for determining dew point humidity to measure contamination with oil or particulate matter.

In one preferred embodiment of the invention, the separating device comprises a cyclonic dirt collector having a body and a lid. A similar type is standard in the industry and is used exclusively on railroad equipment between the branch tee of the train line and the pipe portion bracket. It consists of an inlet/outlet lid. The body can be removed from the unit for cleaning. It is designed to direct the airflow in a cyclonic pattern and use centrifugal force to keep particulate matter and moisture that enters the chamber against the walls of the unit while it allows the air to travel up and out leaving the particulate matter and water behind.

In a preferred embodiment, the apparatus of the invention has air valves placed in line with the intake airflow for shutting off or regulating the flow through the air line. The valves also assist in blowing off condensation from the line prior to use. A second shut off valve is employed to shut off the air supply to the filter system when the blow down valve is being utilized to remove excess condensation from the air line.

Preferably the separator device comprises an air filter capable of removing particulate matter while air enters the filter chamber and then passes out of the filter outlet into the air line of the apparatus.

The inlet and outlet connectors of the apparatus may advantageously be standard rail industry gladhands of the type used to couple air lines of individual pieces of rail equipment to each other when the pieces of rail equipment are assembled to form a train.

In one preferred embodiment, the apparatus comprises a combination of a cyclonic dirt collector and an air filter. In another particularly preferred embodiment, the apparatus comprises a combination of a filter for water, oil and particulate matter, a cyclonic dirt collector, and a desiccant filter canister for removing moisture from the stream of compressed air. Alternatively, the apparatus of the invention may comprise a single filter device, which can be used in conjunction with other testing and filtering units. If desired each filter unit, cyclonic dirt separator and desiccant canister could be fitted with its own set of gladhand connectors so that the individual units could be assembled in any combination or sequence as desired in order to provide customized compressed air treatment of the compressed air from a pipeline from a remote source at the point where the compressed air is introduced from the end of the pipeline into the equipment in which the air is used.

The apparatus may also desirably incorporate a branch tee conduit for receiving a probe from a meter used to test humidity, oil content or particulate matter.

The apparatus of the invention may also comprise an air gauge and manual regulator valves used to control airflow and pressure while testing.

In a preferred embodiment, the operation of one or more desiccant filters is controlled by an air driven control mechanism which cycles the operation of the filters between moisture absorption and regeneration or blow down stages. A particularly preferred embodiment comprises a mechanically driven mechanism which opens and closes a wheel type relay valve. Alternatively, an air powered hemispherical gear could be used in combination with a small generator to generate electrical current to electrically operate relay valves and/or heat the air. One particularly preferred apparatus uses an air driven gear mechanism which in turn utilizes a mangle wheel gear to actuate relay valves to change the airflow direction from supply to blow down operation.

An especially preferred embodiment of the apparatus of the invention comprises a combination of a standard gladhand connector for connecting the apparatus to a compressed air source, which may be a plant line, a train line, etc.; a pressure regulating shut off valve to enable the flow channel through the apparatus to be shut off; a conduit tube for insertion of a test probe; an oil indicator to detect the presence of oil in the compressed air; a needle valve to allow airflow into the oil indicator tube; a pressure gauge to determine air pressure in the apparatus and/or supply line; and an automatic/manual blow down valve that allows the removal of oil, water and particulate matter that has been captured by the filter. In this embodiment, the air line of the apparatus leads through a dual chamber desiccant filter which removes humidity from the system. The use of a dual canister desiccant filter makes it possible to keep the equipment supplied with an uninterrupted supply of air and maintain pressure in the equipment air line by cycling alternately between the two canisters. Prior to entry into the desiccant filter, the air line passes through a cyclonic air/dirt separator or dirt collector which uses centrifugal force to keep contaminants from entering the desiccant filter system. An in line check valve is provided to protect the air pressure in the air line of the equipment if pressure is unintentionally lost or intentionally released in the apparatus. The valve may be disposed downstream of the desiccant filter, but it will appreciated by persons skilled in the art that the check valve could be located in any of various places within the apparatus. The apparatus air line is also connected with a blow down conduit test pipe for blowing condensation and/or other contaminants, which may accumulate in the piping system, from the pipe prior to filtration. A shut-off valve is provided on the blow down pipe to close off the blow down conduit during normal operation of the apparatus. The blow down conduit can also be used to insert a test probe, if desired, to determine dew point humidity or the content of particulate matter in the compressed air prior to filtration.

Another aspect of the present invention provides for a test method and a test apparatus which may be used while equipment is idling or in use. Immediate attachment and detachment without modifications to the equipment or loss of use while it is being monitored is extremely important to the industry.

The apparatus of the invention attaches to a train or truck compressed air line via a coupling on the end of the air hose (gladhand). Railroad, computer rail, transit and trucking industries all utilize a similar type gladhand coupling device for coupling air hoses. The same type of arrangement is also used at the end of the yard plant lines delivering compressed air to equipment.

The invention embodies a "dummy" type gladhand with an orifice allowing the attachment of an oil indicator tester which is connected to a needle valve. The dummy connector is then attached to the gladhand of the equipment's train line hose. For example, the locomotive has air hoses on each end of the equipment. The invention allows the attachment to the gladhand hose on each end of the unit which is not in use. After attachment, the air supply is open in order to pressurize the hose. The dummy gladhand retains the air pressure inside the air hose. The needle valve of the oil indicator is then opened to allow air flow into the indicator. The flow of air in the apparatus of the invention is within the leakage limits of federal regulations; the air flow rate is less than 2 SCIM/PS IG (0.08 mL/s/kPa) through the calibrated plastic tube. For the purposes of this invention, an A-4000 oil indicator and needle valve assembly is utilized. The oil indicator tube is treated with a red oil soluble body designed to react with oil by changing color when there is a presence of oil. The time, pressure and color are then calculated by the use of a chart to determine the amount of oil present in the gas stream. The apparatus can be attached and detached simply and without the need to modify the equipment, and the test can be performed while the equipment is idled or in use.

The dummy gladhand may be equipped with a pressure gauge and/or a pressure release valve to enhance calculations and promote safety.

This invention does not require that the train line or compressor be modified with a threaded orifice to accommodate the needle valve indicator for attachment. The attachment is directly to the dummy gladhand for attachment to equipment.

The invention comprises a dummy gladhand designed to fit with standard gladhand connectors used in compressed air lines in the railroad or trucking industry, etc. In the apparatus of the invention, the dummy gladhand is modified to include at least one threaded orifice and a pressure regulator valve for regulating air flow through the at least one orifice. An oil content indicator comprised of a needle valve and a chemically treated tube are attached to an orifice of the dummy gladhand. An air pressure gauge may also be provided to determine the air pressure in the air line. A quick release pressure valve may be provided to enable rapid release of the pressure from the test apparatus.

The dummy gladhand oil tester can be reused repeatedly on different pieces of equipment, and it only requires replacement of the oil indicator tube for each new test.

In accordance with a further aspect of the invention, the invention comprises a method of preventing contamination of an air brake line of a train with contaminants from a rail yard compressed air supply pipeline used to charge the air brake line of the train at remote locations in a rail yard with air from a central compressor system, in which the method comprises the steps of connecting the inlet connector of an apparatus according to the invention as described herein to an outlet of the compressed air supply pipeline, connecting the outlet connector of the apparatus to an inlet to an air brake compressed air line of a train, and charging the air brake compressed air line of the train with compressed air from the compressed air supply pipeline which has been passed through said apparatus to remove contaminants such as moisture, entrained oil droplets and/or particulate matter such as dirt or rust particles therefrom.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
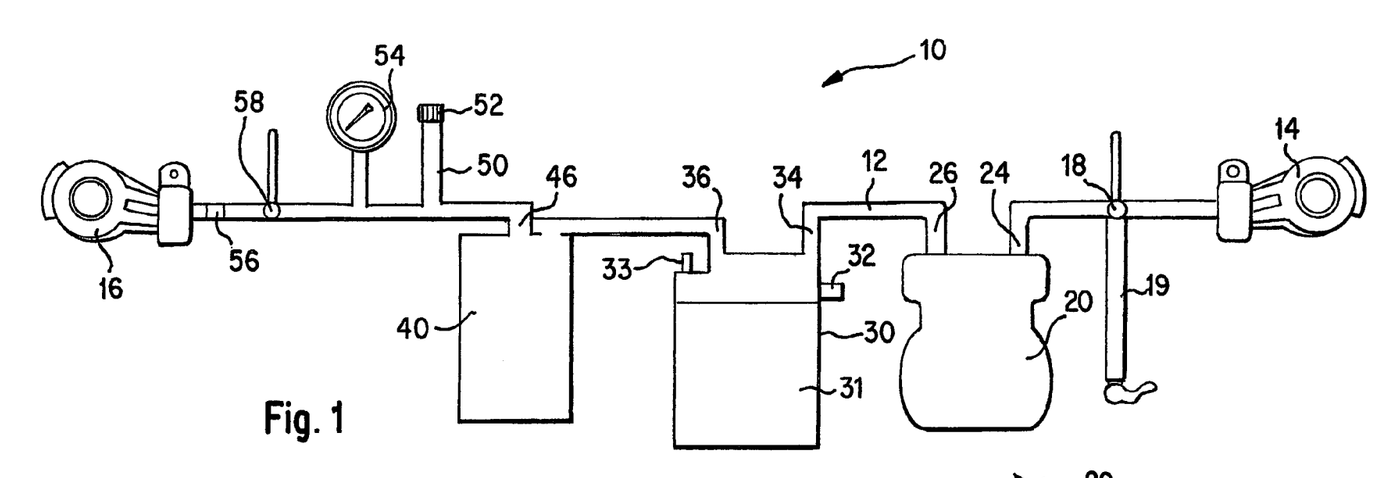
FIG. 1 is a schematic representation of a first preferred apparatus according to the invention.

FIG. 1 schematically illustrates an apparatus 10 according to the present invention. The apparatus comprises an air line 12 having an inlet connector 14 at one end and an outlet connector 16 at the other end. Preferably inlet and outlet connectors 14 and 16 may be gladhand connectors of the type used to connect the compressed air lines of railroad locomotives and cars when a train is formed. A shut-off or flow regulating valve 18 is provided in air line 12 adjacent inlet connector 14. Shut-off valve 18 enables the airflow through air line 12 to be interrupted and also makes it possible to divert the airflow through a blow down conduit 20 in order to purge condensate from a compressed air source to which inlet connector 14 may be connected before admitting compressed air from the source into the apparatus. In the illustrated apparatus, compressed air passing through air line 12 enters a cyclonic dirt collector 22 disposed on air line 12 downstream of valve 18. Cyclonic dirt collector 22 separates water droplets, entrained oil droplets and/or particulate matter such as rust from the compressed air stream. From the outlet 26 of cyclonic dirt collector 22, the compressed air stream passes through air line 12 to a desiccant chamber 30 filled with a desiccant material 31 which extracts any moisture remaining in the form of water vapor from the compressed air stream. To facilitate regeneration of the desiccant 31 in desiccant chamber 30, the chamber is also provided with a blow down cycle vent 32 as well as an air vent to the atmosphere 33. From the outlet 36 of desiccant chamber 30 the compressed air stream then passes through air line 12 to a filter unit 40 where any remaining contaminants are removed. Downstream of filter 40 on air line 12 there is a branch tee 50 which is adapted to receive measuring probes for measuring the moisture content and/or oil content and/or particulate contaminant content of the air stream. A threaded cap 52 is provided to close off branch conduit 50 when no probe is inserted therein. A pressure gauge 54 is provided to enable the pressure of a compressed air stream provided by the apparatus to be monitored. A check valve 56 is provided in air line 12 adjacent outlet connector 16 which allows air to flow only in the direction from inlet connector 14 to outlet connector 16. This protects the air pressure in a piece of equipment to which outlet connector 16 may be connected in the event that the apparatus is intentionally or unintentionally depressurized. A further shut-off or flow regulating valve, such as ball valve 58, is also provided adjacent outlet connector 16.

Figures 2, 4:
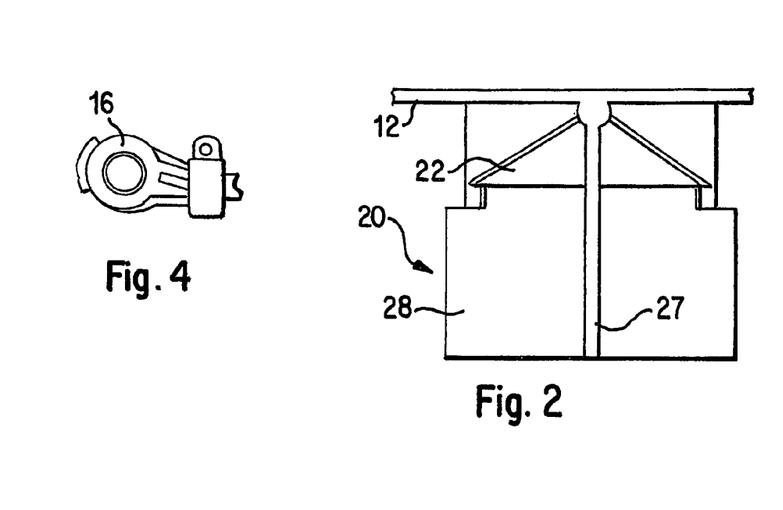
FIG. 2 is an enlarged illustration of a centrifugal dirt collector which may be used in the apparatus of the invention.
FIG. 4 is a schematic representation of a gladhand connector which may be used as the inlet and outlet connectors in the apparatus of the invention.

FIG. 2 shows an enlarged view of cyclonic dirt collector 20. Air line 12 enters the cyclonic dirt collector at the top, where the air is caused to swirl so that centrifugal force throws water droplets, entrained oil droplets and/or dirt particles against the outer walls of the device. These contaminants fall down past conical separator lid 22 into collecting chamber 28.

Figure 3:
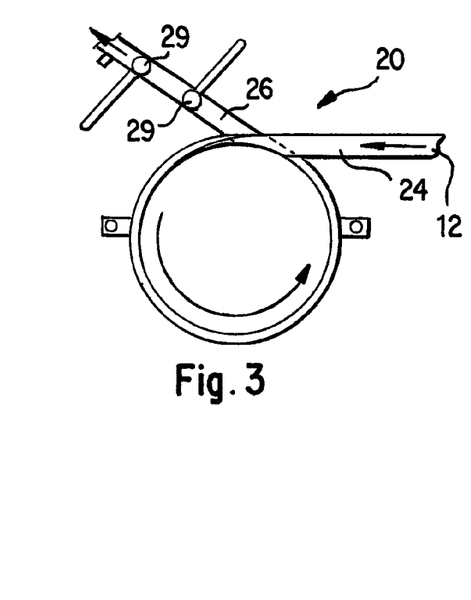
FIG. 3 is a top plan view of a cover for use with the centrifugal dirt collector of FIG. 2.

The tangential entry of compressed air from line 12 into cyclonic dirt collector 20 is illustrated in FIG. 3. This figure shows the discharged air also being drawn from the periphery of the apparatus, but if desired, it is also possible to withdraw clean air from the apparatus through a central tube 27 as illustrated in FIG. 2. If desired, one or more regulating valves 29 may be provided on conduit 12 to regulate the flow of air through the cyclonic dirt collector 20.

FIG. 4 illustrates the general form of a gladhand connector 16, which represents the preferred embodiment of the inlet connector or outlet connector of the apparatus of the invention. The use of such connectors enables the apparatus to be easily interposed between the outlet of a rail yard compressed air supply pipeline and a train composed of one or more locomotives and a plurality of railroad cars in order to charge the compressed air system of the train with clean air, notwithstanding the possibility of contaminants having entered the air supply pipeline between the central compressor and the remote outlet to which the apparatus is connected.

Figure 5:
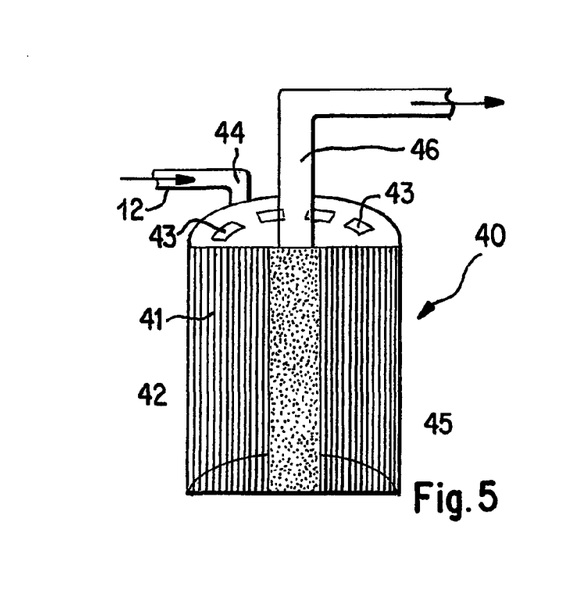
FIG. 5 is an enlarged representation of an air filter element which may be used in the apparatus of the invention.

FIG. 5 is an enlarged illustration of an air filter 40 which may be used in the apparatus of the invention. Air from air line 12 passes through inlet 44 to an upper area of the filter unit 40, from whence it passes through openings 43 into an annular chamber 42 surrounding a filter element 41. The air then passes through the filter element 41 to openings 44 in a central tube 45 from whence it passes to filter outlet 46 freed of any residual contaminants. Typically, filter unit 40 will remove all remaining contaminants down to about 5 microns in size.

Figure 6:
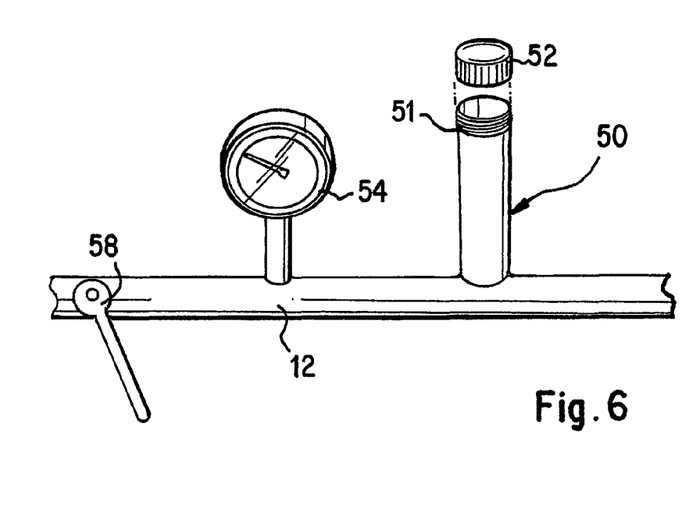
FIG. 6 is a schematic representation of a branch tee arrangement adapted to receive test probes for measuring the level of contamination of a compressed air stream passed through the apparatus of the invention.

FIG. 6 is an enlarged view of the branch tee 50. As previously mentioned, when not receiving a measuring probe for testing the contamination of an air stream passing through air line 12, branch tee 50 is closed off by a threaded cap 52 which is screwed onto mating threads 51 at the free end of the branch tee. It is particularly advantageous to insert a humidity testing probe through branch tee 50 to assure that the compressed air stream is sufficiently free of moisture that harmful condensation cannot occur in the air brake line of a train or other equipment which utilizes the compressed air stream. Pressure gauge 54 and flow regulating valve 58 are also seen in FIG. 6.

Figure 7:
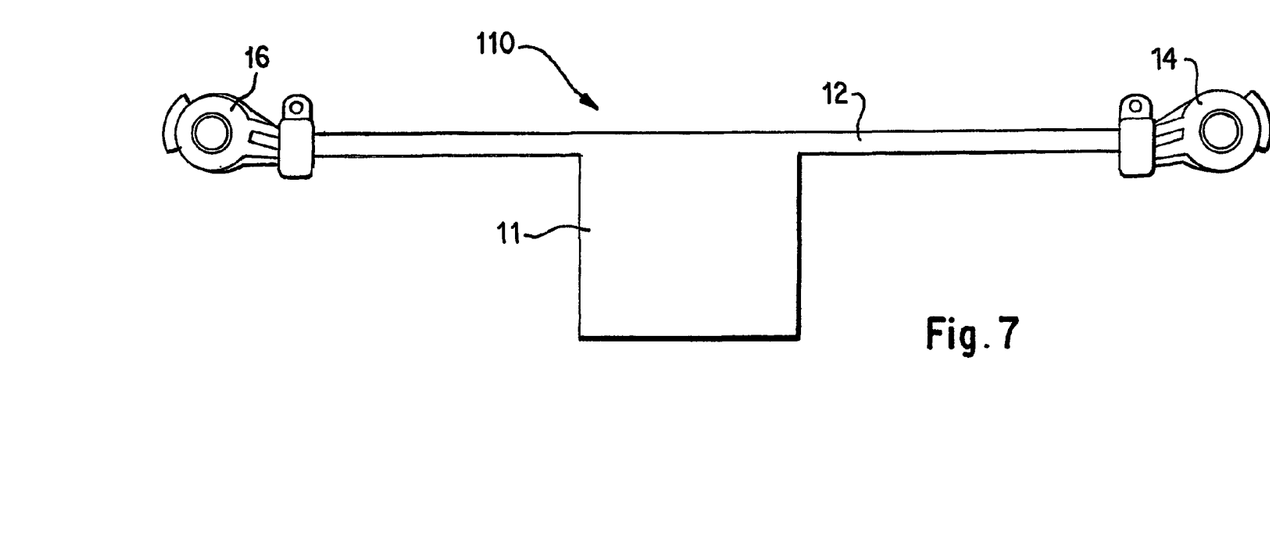
FIG. 7 is a schematic representation of a simplified apparatus according to the invention.

FIG. 7 shows a simplified apparatus 110 according to the invention comprising an air line 12 with an inlet connector 14 at one end and an outlet connector 16 at the other. Interposed between the two connectors is a separator device 11 for removing contaminants from a compressed air stream passed through air line 12. Separator device 11 may correspond to a cyclonic dirt collector 20 or to a desiccant chamber 30 or to a filter unit 40, as desired. In situations where contamination of the compressed air stream is low, a single separator device may suffice to deliver a clean stream of compressed air to the equipment where it is used. However, the modules according to FIG. 7 may also be combined with additional modules to form any desired sequence and/or combination of modules by connecting the outlet connector of one module to the inlet connector of another, and so on. In this way, the number and arrangement of modules can easily be varied as desired, depending on the particular circumstances, and any desired number and arrangement of cyclonic separators, desiccant chambers, filter units and/or other separator devices may be easily combined.

Figure 8:
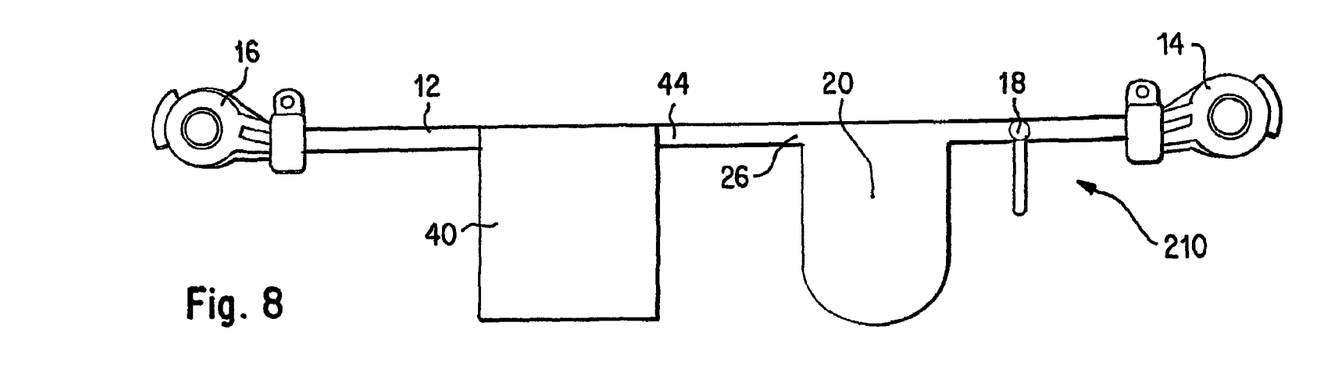
FIG. 8 is a schematic representation of another apparatus embodiment according to the invention comprising a cyclonic dirt collector and an air filter unit in combination.

FIG. 8 shows an embodiment of the invention comprising an air line 12 with an inlet connector 14 at one end and an outlet connector 16 at the other, as well as a flow regulating valve 18 interposed in air line 12 adjacent inlet connector 14. A compressed air stream passing through air line 12 successively passes through a cyclonic dirt collector 20 and then through an air filter device 40, which removes any residual contaminants down to about 5 microns in size which were not separated in the cyclonic dirt collector.

Figure 9:
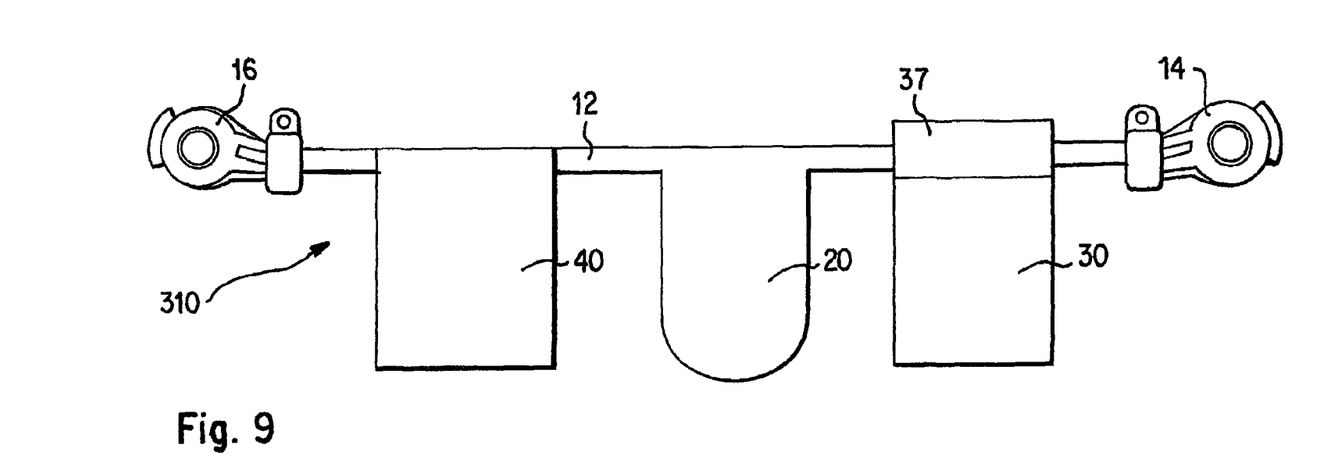
FIG. 9 is a schematic representation of another embodiment of the apparatus of the invention comprising a desiccant chamber, a cyclonic dirt collector and a filter unit in combination.

FIG. 9 illustrates another alternate embodiment of the apparatus in which a compressed air stream traversing air line 12 between gladhand inlet connector 14 and gladhand outlet connector 16 successively traverses a desiccant chamber 30, a cyclonic dirt collector 20 and an air filter 40. At the top of desiccant chamber 30 there is a clock mechanism 37 which cycles the desiccant chamber between an air drying stage of operation and a blowdown or regeneration stage of operation.

Figure 10:
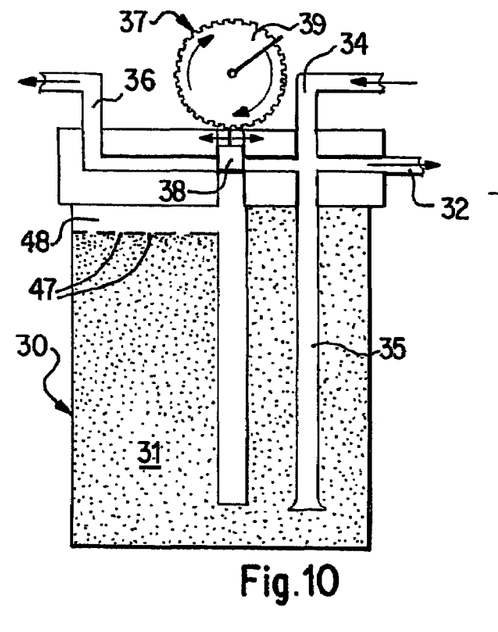
FIG. 10 is an enlarged view of a desiccant chamber useful in the apparatus of the invention.

FIG. 10 is an enlarged view of a desiccant chamber 30 which may be used in the apparatus of the invention. Compressed air enters the desiccant chamber through an inlet 34 and passes downwardly through a diffuser pipe 35 embedded in a bed of desiccant material 31. The compressed air then passes through the desiccant material 31, during which time any moisture in the compressed air is absorbed by the desiccant material. The dry compressed air then passes through openings 47 at the top of the desiccant bed into a discharge line 48 which communicates both with desiccant chamber outlet 36 and with blowdown vent 32. A valve 38 interposed in discharge line 48 at the junction selectively directs the flow either to outlet 36 or to blowdown vent 32. Valve 38 is actuated by a gear wheel 39 which is part of clock mechanism 37. When the desiccant is dry so that it absorbs moisture from the compressed air stream, valve 38 is switched so that the compressed air stream flows out through desiccant chamber outlet 36. However, as the desiccant approaches saturation so that moisture extraction diminishes, then valve 38 is switched so that the air stream is discharged through blowdown vent 32. At the same time, a stream of dry air is introduced through inlet 34 to extract moisture from the desiccant material 31 and regenerate it. When the desiccant material 31 is dry enough again to reliably extract moisture from the compressed air stream, then valve 38 is switched back and compressed air is again introduced through inlet 34 and passed through the desiccant chamber to outlet 36.

Figure 11:
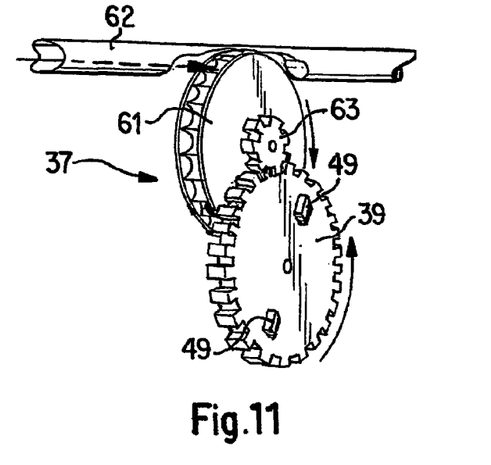
FIG. 11 is a schematic representation of a clock mechanism which may be used to control the operation of a desiccant chamber in the apparatus of the invention.
Figure 12A:
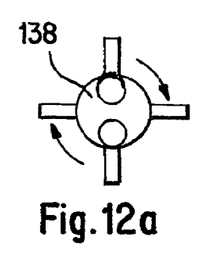
FIGS. 12(a) and 12(b) are schematic representations of rotary valve units which may be used to control the operation of a desiccant chamber in the apparatus of the invention.
Figure 12B:
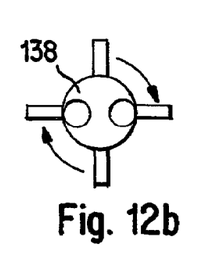

FIG. 11 is a detailed view of clock mechanism 37. An air wheel 61 is turned by an air stream passing through air conduit 62. This air stream may be the compressed air stream through conduit 12, or it may be a bleed stream from the compressed air stream. A gear wheel 63 on air wheel 61 turns gear wheel 39. Valve trip members 49 on gear wheel 39 actuate valve 38 to switch the air flow through the desiccant chamber between the outlet 36 and the blowdown vent 32. This type of mechanism is particularly advantageous if more than one desiccant chamber is provided so that valve 38 alternately switches the airflow between two desiccant chambers. In this way, one of the two desiccant chambers can operate in an air drying stage in which it absorbs moisture from a compressed air stream, while the other desiccant chamber operates in a blowdown stage in which moisture laden desiccant in the desiccant chamber is regenerated. The switching between two such desiccant chambers can easily be achieved by rotary valves 138 as are shown in FIGS. 12(a) and 12(b). In one position valves 138 direct the compressed air stream from one desiccant chamber to the chamber outlet 36 and the air stream from a second desiccant chamber to the blowdown vent 32, while in the other position the air flows are reversed.

Figure 13:
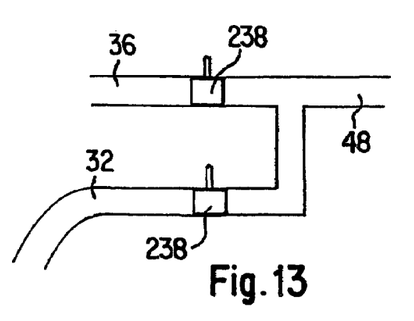
FIG. 13 is a representation of a valve arrangement which may be used to control the air flow in apparatus according to the invention.

Another possible valve arrangement is shown in FIG. 13 in which air from discharge 48 is directed either to desiccant chamber outlet 36 or to blowdown vent 32 by a pair of relay valves 238 operated by clock mechanism 37. If desired, the two relay valves may be interlocked so that one is necessarily open when the other is closed.

Figure 14:
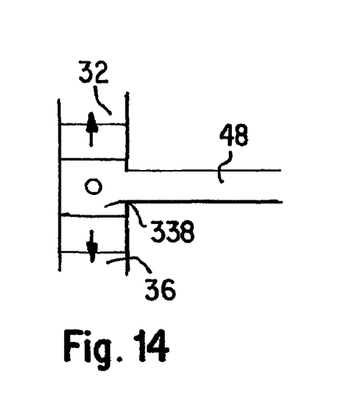
FIG. 14 is a schematic representation of an alternate valve configuration for controlling air flow in the apparatus of the invention.

A further arrangement is illustrated in FIG. 14 in which air from discharge line 48 is directed either to outlet 36 or to blowdown vent 32 by a relay valve 338, which depending on its position, opens one of the two and blocks the other.

Figure 15:
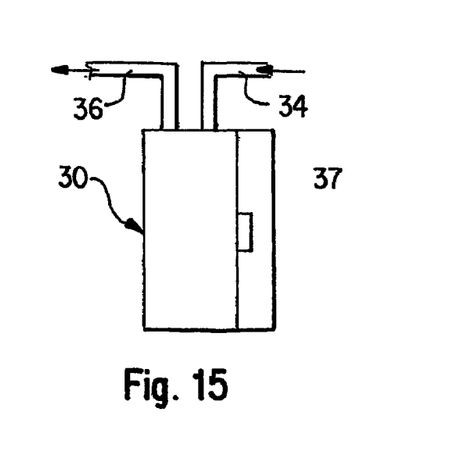
FIG. 15 is a schematic representation of an alternate desiccant chamber which may be used in apparatus of the invention.

FIG. 15 shows a desiccant chamber arrangement in which the clock mechanism 37 is disposed at the side of desiccant chamber 30.

Figures 16, 17:
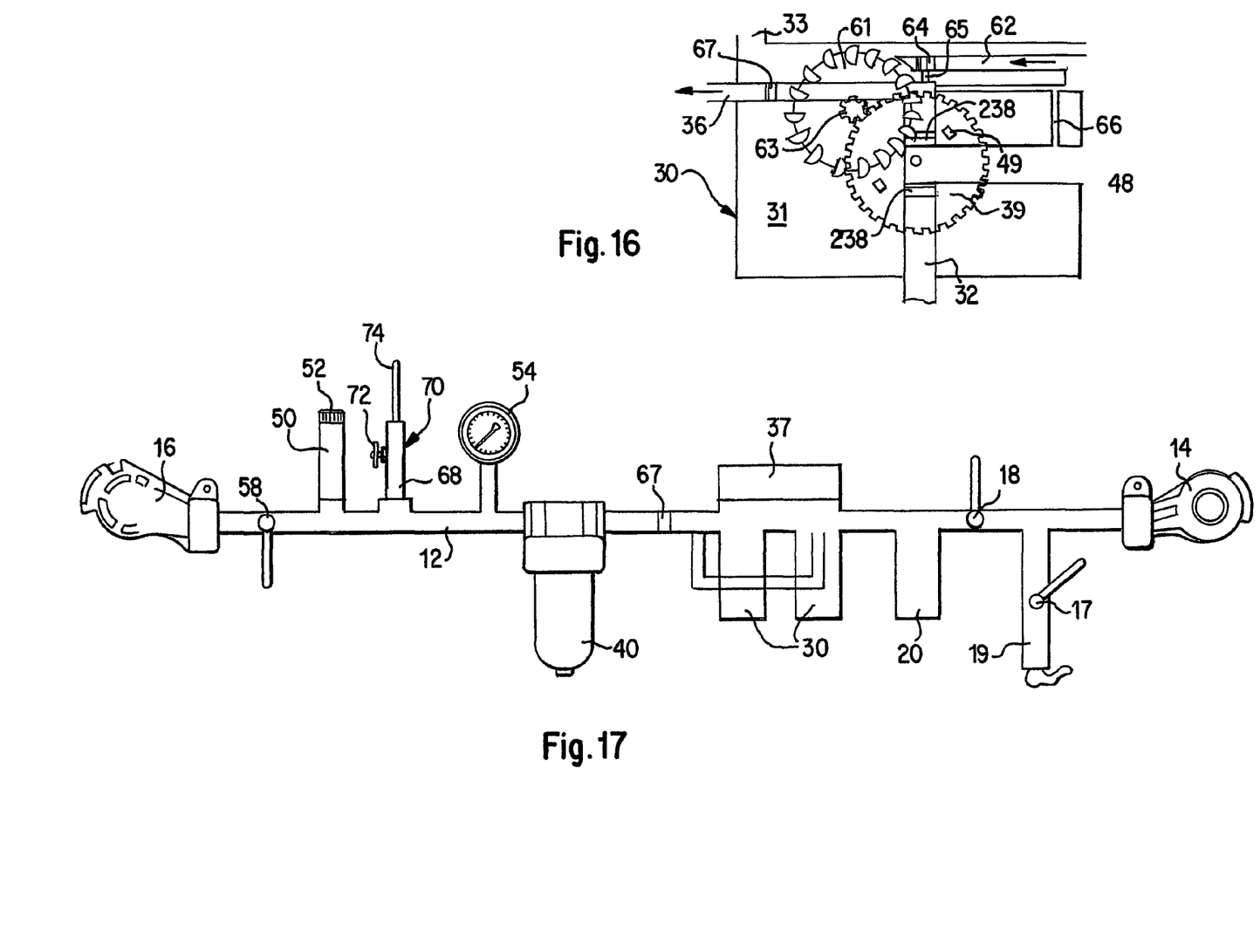
FIG. 16 is a schematic representation of another desiccant chamber which may be used in apparatus of the invention.
FIG. 17 is a schematic representation of an especially preferred treating apparatus according to the invention.
Figure 18:
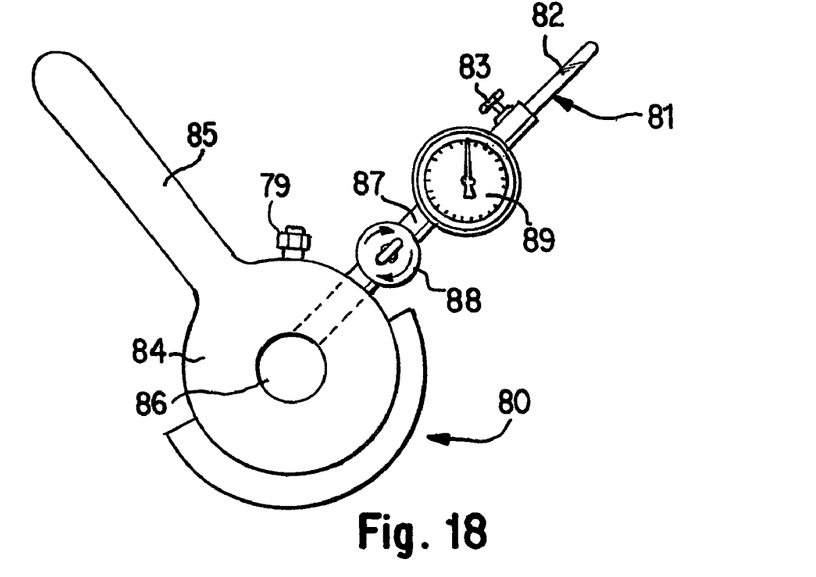
FIG. 18 is a front elevational view of another apparatus according to the invention for testing an air stream.
Figure 19:
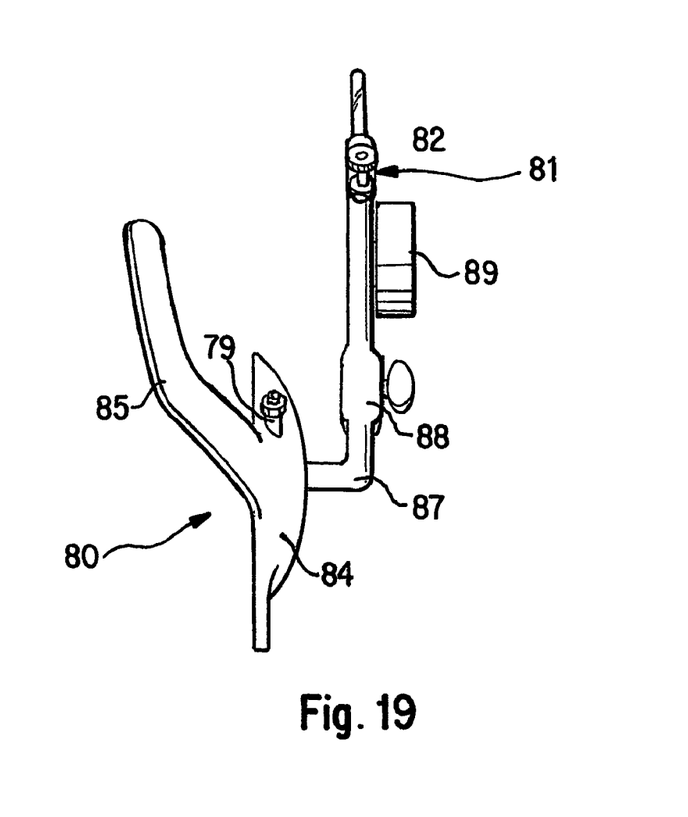
FIG. 19 is a side view of the apparatus of FIG. 18.
Figure 20:
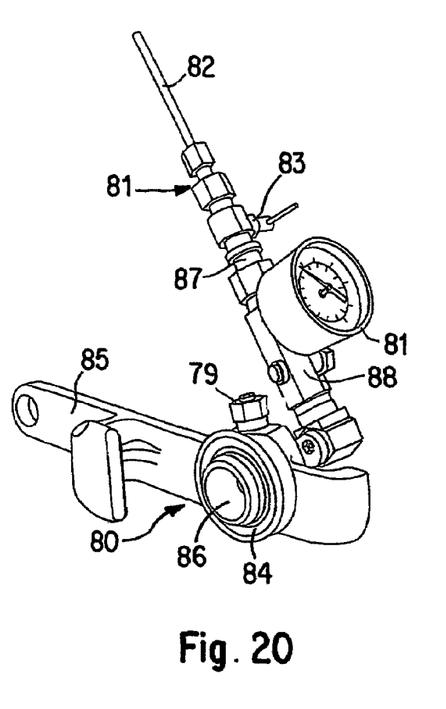
FIG. 20 is a perspective view of the apparatus of FIGS. 18 and 19.
Figure 21:
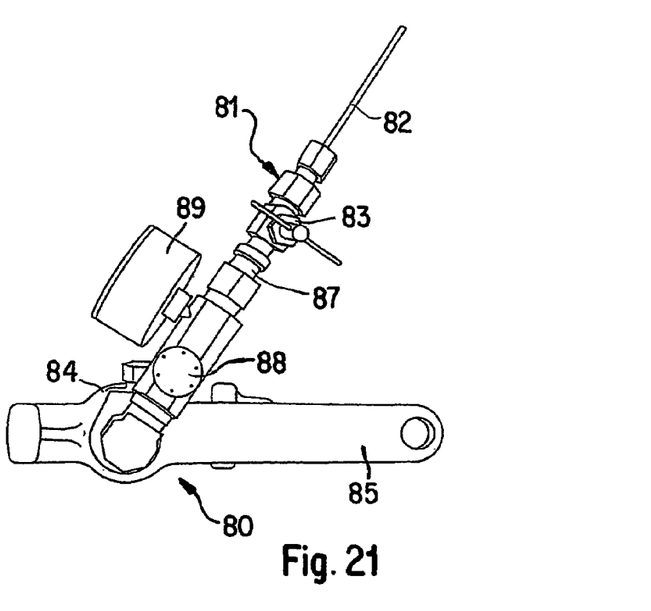
FIG. 21 is a rear view of the apparatus of FIGS. 18–20.

FIG. 16 shows another desiccant chamber configuration which can be used with the apparatus of the invention. Compressed air from desiccant chamber 30 is collected in discharge line 48 and is selectively directed by on-off relay valves 238 to desiccant chamber outlet 36 or to blowdown vent 32. The on-off relay valves 238 are operated by trips 49 on gear wheel 39 which is turned by a gear 63 mounted on hemispherical cup air wheel 61. Air wheel 61 is driven by an air stream discharged from air conduit 62 which in turn communicates with discharge line 48 through bleed line 66. To regulate the air pressure an in-line choke is used. If desired, an equalizing pressure valve 64 can be provided in air conduit 62 which communicates with outlet 36 through a connecting line 65 and stops the clock. This arrangement can use a single air relay valve which is a more efficient arrangement. An optional check valve 67 can be provided in outlet 36 to prevent back flows of air.

As an alternative, the air wheel could be used to turn a generator to produce electricity which in turn could be used to operate electrical relays and an electrical timer.

FIG. 17 schematically illustrates an especially preferred embodiment of the apparatus of the invention. A gladhand inlet connector 14 and a gladhand outlet connector 16 are provided on air line 12. Adjacent inlet connector 14 is a blowoff conduit 19. A valve 17 is provided on the blowoff conduit to selectively open and close it. A second valve 18 is also provided to selectively open or close air line 12. Of course, valves 17 and 18 could be replaced by a single valve as illustrated in FIG. 1. The apparatus of FIG. 17 further includes a schematically illustrated cyclonic dirt collector 20 followed by a pair of desiccant chambers 30. A clock mechanism 37 alternately cycles the two desiccant chambers 30 between an air drying stage in which the desiccant chamber discharges dry air through air line 12 and a blowdown stage in which the desiccant chamber discharges through a blowdown vent. A check valve 67 is interposed in air line 12 to prevent backflows. The desiccant chambers are followed by a filter unit 40 which removes any residual water, oil and/or particulates. A pressure gauge 54 is also provided on air line 12. The pressure gauge is followed by an oil content indicator 70 comprising a branch tee 68 having a needle valve 72 and an oil indicator tube 74 thereon. The oil indicator tube is transparent and is lined with a substance which undergoes a color change when contacted by oil. By opening needle valve 72, a bleed stream is allowed to escape from air conduit 12 carrying with it a proportionate amount of any entrained atomized oil in the compressed air stream. As this bleed stream exits the air indicator tube, a color change will indicate excessive oil contamination of the compressed air stream. Branch tee 50 is also provided through which a test probe for measuring the humidity of the compressed air stream can be inserted. When a humidity testing probe is not present, branch tee 50 is closed off with a threaded cap 52. A further flow regulating valve 58 is provided on air line 12 adjacent outlet gladhand connector 16.

FIGS. 18–21 illustrate an apparatus 80 for testing a compressed air stream for oil contamination. Test apparatus 80 comprises a dummy gladhand connector 84 of the type used to close off the end air line of an end rail car or locomotive in a train. A handle 85 on dummy gladhand 84 enables it to be turned into and out of position on a mating gladhand connector. Instead of being completely closed, dummy gladhand 84 has an orifice 86 which communicates between the air line terminated by the dummy gladhand and a branch tube 87. Branch tube 87 is provided with a flow regulating valve 88 and a pressure gauge 89. At the end of branch tube 87 is an oil content indicator 81 which comprises an oil indicator tube 82 and a needle valve 83. Regulator valve 88 is optional to adjust the air pressure in the test apparatus. Air pressure gauge 89 is likewise optional. The test apparatus 80 is further provided with a quick release valve 79 which enables the pressure in the test apparatus to be quickly released.

To use the test device, the dummy gladhand is connected to a gladhand connector at the end of an air line containing an air stream to be connected. A bleed stream of air is then discharged through branch tube 87 and oil indicator 81. Oil indicator tube 22, which is lined with a substance which undergoes a color change when contacted by oil, is then observed for an indication of oil contamination in the compressed air stream.

Figure 22:
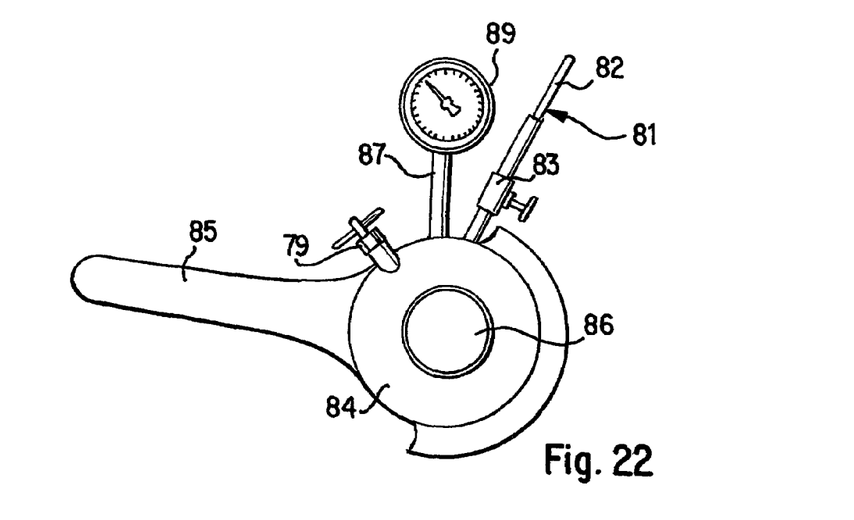
FIG. 22 is a schematic representation of an alternate apparatus according to the invention.

FIG. 22 illustrates an alternate test apparatus according to the present invention. Instead of being mounted on a common branch conduit 87, in this embodiment the oil indicator 81 and the pressure gauge 89 are individually mounted on separate branch conduits. The optional flow regulating valve 88 is omitted in this embodiment. In all other respects, the operation of this embodiment is the same as that of the embodiment illustrated in FIGS. 18–21.

The embodiments described above are, of course, not the only means by which the invention can be realized. Persons skilled in the art could devise the mechanism to operate in numerous ways all of which would be able to accomplish the goal of directing the air flow from supply to blow down and back to supply. The above description is not meant to be limiting and accordingly, the invention should be construed broadly to include any suitable mechanical, pneumatic or electrical means that would accomplish the purposes of the exemplary embodiments described above.

What is claimed is:

1. An apparatus for treating a compressed air stream from a remote compressed air source and delivering the treated air stream to equipment which used the compressed air, said apparatus being portable and comprising an air line, a releasable inlet connector at one end of the air line, a releasable outlet connector at the other end of said air line, and at least one separator device interposed in the air line between the inlet connector and the outlet connector for separating moisture, entrained oil and/or particulate matter from a stream of compressed air passing through said portable apparatus, wherein said separator device comprises a desiccant chamber and a mechanism for cycling the desiccant chamber between an air drying stage and a blow down stage, said cycling mechanism comprising an air driven clock which opens and closes relay valves to switch the desiccant chamber between air drying operation and blow down operation.

2. An apparatus according to claim 1, wherein said remote compressed air source is a piping delivery system from an air compressor.

3. An apparatus according to claim 1, wherein said separator device comprises a cyclone separator.

4. An apparatus according to claim 1, wherein said separator device comprises a filter.

5. Apparatus according to claim 1, comprising a plurality of desiccant chambers and means for alternately cycling said desiccant chambers between a moisture absorption stage and a regeneration stage.

6. An apparatus according to claim 1, further comprising a pressure gauge for measuring the pressure of air in said apparatus.

7. An apparatus according to claim 1, further comprising at least one flow regulating valve for regulating air flow through the apparatus.

8. An apparatus according to claim 1, further comprising a check valve in the air line for preventing loss of pressure in an air line to which the apparatus is connected if pressure is released in the apparatus.

9. An apparatus according to claim 8, wherein said check valve is interposed in the air line adjacent the outlet connector.

10. A method of preventing contamination of an air brake line of a train with contaminants from a rail yard fixed compressed air supply pipeline used to charge the air brake line of the train at remote locations in a rail yard with air from a central compressor system, said method comprising the steps of connecting the inlet connector of a portable apparatus according to claim 1 to an outlet of the fixed compressed air supply pipeline, connecting the outlet connector of said portable apparatus to an inlet to an air brake compressed air line of a train, and charging the air brake compressed air line of the train with compressed air from said fixed compressed air supply pipeline which has been passed through said portable apparatus.

11. An apparatus for treating a compressed air stream from a remote compressed air source and delivering the treated air stream to equipment which used the compressed air, said apparatus comprising an air line, an inlet connector at one end of the air line, an outlet connector at the other end of said air line, and at least one separator device interposed in the air line between the inlet connector and the outlet connector for separating moisture, entrained oil and/or particulate matter from a stream of compressed air passing through said apparatus, wherein at least one of said inlet connector and said outlet connector is a gladhand connector.

12. An apparatus according to claim 11, wherein said inlet connector and said outlet connector are gladland connectors.

13. An apparatus for treating a compressed air stream from a remote compressed air source and delivering the treated air stream to equipment which used the compressed air, said apparatus comprising an air line, an inlet connector at one end of the air line, an outlet connector at the other end of said air line, and at least one separator device interposed in the air line between the inlet connector and the outlet connector for separating moisture, entrained oil and/or particulate matter from a stream of compressed air passing through said apparatus, wherein said remote compressed air source is a piping delivery system from an air compressor, and said piping delivery system is a rail yard compressed air supply network for supplying compressed air from a central air compressor to railroad equipment at remote locations in said rail yard.

14. An apparatus for treating a compressed air stream from a remote compressed air source and delivering the treated air stream to equipment which used the compressed air, said apparatus comprising an air line, an inlet connector at one end of the air line, an outlet connector at the other end of said air line, and at least one separator device interposed in the air line between the inlet connector and the outlet connector for separating moisture, entrained oil and/or particulate matter from a stream of compressed air passing through said apparatus, further comprising a shutoff valve in the air line and a branch conduit open to the atmosphere interposed between the inlet connector and said shutoff valve, and a valve on the branch conduit for closing of the branch conduit, whereby by shutting the shutoff valve and opening the valve on the branch conduit, condensate from an air supply line to which the apparatus has been connected can be blown out of the apparatus through said branch line.

15. An apparatus for treating a compressed air stream from a remote compressed air source and delivering the treated air stream to equipment which used the compressed air, said apparatus comprising an air line, an inlet connector at one end of the air line, an outlet connector at the other end of said air line, and at least one separator device interposed in the air line between the inlet connector and the outlet connector for separating moisture, entrained oil and/or particulate matter from a stream of compressed air passing through said apparatus, further comprising a blow down conduit tube connected to the air line of the apparatus through a shut-off valve for purging the apparatus when the shut-off valve is opened.

16. An apparatus according to claim 15, wherein said blow down conduit tube is adapted to receive a test probe for measuring dew point humidity, oil content and/or particulate matter content of air in said apparatus.

17. An apparatus according to claim 16, wherein said blow down conduit tube is a branch tee.

18. An apparatus for testing for oil in an air stream, said apparatus comprising in combination a dummy gladhand containing a pressure regulator valve, and an oil content indicator tube with a needle valve.

19. An apparatus according to claim 18, further comprising an air pressure gauge for measuring the pressure in an air line to which the apparatus is connected.

20. An apparatus according to claim 18, further comprising a quick release valve for rapidly releasing air pressure within the apparatus.

21. An apparatus according to claim 18, wherein said oil content indicator tube contains a dye which undergoes a visible change in color when contacted by oil.

* * * * *